US012775373B2

(12) United States Patent
Zhang et al.

(10) Patent No.: US 12,775,373 B2
(45) Date of Patent: Oct. 27, 2026

(54) MEDICAL DEVICE AND INFORMATION DISPLAY METHOD THEREFOR

(71) Applicant: SHENZHEN MINDRAY BIO-MEDICAL ELECTRONICS CO., LTD., Shenzhen (CN)

(72) Inventors: Jianhui Zhang, Shenzhen (CN); Ruiling Pan, Shenzhen (CN)

(73) Assignee: SHENZHEN MINDRAY BIO-MEDICAL ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 18/213,950

(22) Filed: Jun. 26, 2023

(65) Prior Publication Data

US 2023/0333730 A1 Oct. 19, 2023

Related U.S. Application Data

(63) Continuation of application No. PCT/CN2021/141220, filed on Dec. 24, 2021.

(30) Foreign Application Priority Data

Dec. 25, 2020 (CN) ......................... 202011562887.5
Dec. 28, 2020 (WO) ................ PCT/CN2020/140348
Jul. 30, 2021 (CN) ......................... 202110875279.8

(51) Int. Cl.
*G06F 3/0487* (2013.01)

(52) U.S. Cl.
CPC .. *G06F 3/0487* (2013.01); *G06F 2203/04803* (2013.01)

(58) Field of Classification Search
None
See application file for complete search history.

(56) References Cited

U.S. PATENT DOCUMENTS 8,092,426 B2 1/2012 Molnar
2007/0191789 A1* 8/2007 Hickle ................. A61M 5/172 604/257

(Continued)

FOREIGN PATENT DOCUMENTS

CN 101053521 A 10/2007
CN 103544688 A 1/2014

(Continued)

OTHER PUBLICATIONS

International Search Report issued in corresponding International Application No. PCT/CN2021/141220 mailed Mar. 22, 2022, 4 pages.

(Continued)

*Primary Examiner* — Sarvesh J Nadkarni
(74) *Attorney, Agent, or Firm* — SYNCODA LLC; Feng Ma

(57) ABSTRACT

A medical device and an information display method are disclosed. The medical device includes a memory, a processor, and a display. The memory is used for storing an executable program. The display interface of the display includes multiple interactive display units. The processor is used for executing the program stored in the memory, so that the processor executes the following operations: obtaining medical information of multiple target objects, from multiple source devices; associating the medical information of different target objects with different display units; and receiving an interactive operation of a user for the display units, and displaying, on the display interface, a detailed information interface of the target objects corresponding to the display units, where the detailed information interface displays a multi-device fusion display interface, the multi-device fusion display interface is used for displaying the medical information of the multiple source devices.

11 Claims, 12 Drawing Sheets

(56) References Cited

U.S. PATENT DOCUMENTS

| | | | | |
|---|---|---|---|---|
| 2008/0094227 | A1 | 4/2008 | Becker et al. | |
| 2009/0092298 | A1* | 4/2009 | Xu | G06T 7/33 382/128 |
| 2009/0112630 | A1* | 4/2009 | Collins, Jr. | H04L 67/125 705/2 |
| 2011/0004071 | A1 | 1/2011 | Faiola | |
| 2011/0072381 | A1* | 3/2011 | Gannon | G16H 15/00 715/771 |
| 2013/0044111 | A1* | 2/2013 | VanGilder | A61B 5/743 345/440 |
| 2013/0235080 | A1* | 9/2013 | Robinson | A61M 16/021 345/619 |
| 2013/0342668 | A1* | 12/2013 | Kasumi | A61B 1/0002 348/74 |
| 2014/0243635 | A1 | 8/2014 | Arefieg | |
| 2017/0020489 | A1 | 1/2017 | Kang | |
| 2020/0069259 | A1* | 3/2020 | Kano | G16H 30/20 |
| 2021/0057111 | A1* | 2/2021 | Barkol | H04L 51/046 |

FOREIGN PATENT DOCUMENTS

| | | | |
|---|---|---|---|
| CN | 103876835 | A | 6/2014 |
| CN | 104361230 | A | 2/2015 |
| CN | 104545987 | A | 4/2015 |
| CN | 106730110 | A | 5/2017 |
| CN | 109310345 | A | 2/2019 |
| CN | 109893709 | A | 6/2019 |
| CN | 110610760 | A | 12/2019 |
| CN | 111166357 | A | 5/2020 |
| CN | 111671400 | A | 9/2020 |
| JP | 2015000175 | A | 1/2015 |
| WO | 2009050736 | A1 | 4/2009 |
| WO | 2020199208 | A1 | 10/2020 |

OTHER PUBLICATIONS

International Search Report issued in related International Application No. PCT/CN2020/140348 mailed Oct. 8, 2021, 4 pages.

Extended European Search Report issued in related European Application No. 21909564.3 mailed May 7, 2025, 9 pages.

* cited by examiner

MEDICAL DEVICE AND INFORMATION DISPLAY METHOD THEREFOR

CROSS-REFERENCE TO RELATED APPLICATIONS

This application is a continuation of International Application No. PCT/CN2021/141220, filed on Dec. 24, 2021, which claims priority to Chinese Patent Application No. 202110875279.8, filed Jul. 30, 2021, Chinese Patent Application No. 202011562887.5, filed Dec. 25, 2020, and International Application No. PCT/CN2020/140348, filed Dec. 28, 2020. The entire contents of each above-referenced application are expressly incorporated herein by reference.

TECHNICAL FIELD

The disclosure relates to the technical field of medical device, and more particularly to a medical device and an information display method therefor.

BACKGROUND

At present, when a central station or monitor displays information for multiple bedside devices, the information display is usually based on the monitor, and the information of other devices is integrated into monitoring information, such that the monitor information and the information of other devices cannot be clearly distinguished therebetween. Even displaying the information from other devices in a separate window is significantly different from the displays of the source devices. When observing patient data, the user cannot easily obtain the necessary information from numerous data.

SUMMARY

This disclosure is provided to address at least one of the above problems.

According to one aspect of this disclosure, a medical device is provided, including a memory, a processor, and a display;

- wherein the memory is configured to store executable program(s), a display interface of the display includes multiple interactive display units, the processor is configured to execute the program(s) which is(are) stored in the memory, so as to enable the processor to perform following steps:
- acquiring medical information of multiple target objects, wherein the medical information of each target object is from multiple source devices;
- associating the medical information of different target objects with different display units; and
- receiving interactive operation of a user on a display unit, and displaying, on the display interface, detailed information interface of a target object which corresponds to said display unit, wherein the detailed information interface is configured to display a multi-device fusion display interface;
- wherein the multi-device fusion display interface is configured to display the medical information from the multiple source devices and includes multiple display areas, wherein each display area displays the medical information from at least one source device, and different display areas correspond to different source devices.

According to another aspect of this disclosure, an information display method for a medical device is displayed, wherein the medical device has a display interface, which includes multiple interactive display units; wherein the information display method includes:

- acquiring medical information of multiple target objects, wherein medical information of each target object is derived from multiple source devices;
- associating medical information of different target objects with different display units; and
- receiving interactive operation of a user on a display unit, and displaying, on the display interface, detailed information interface of a target object which corresponds to said display unit, wherein the detailed information interface is configured to display a multi-device fusion display interface;
- wherein the multi-device fusion display interface is configured to display medical information from the multiple source devices and includes multiple display areas, wherein each display area displays the medical information from at least one source device, and different display areas correspond to different source devices.

According to another aspect of this disclosure, a medical device is provided, including a memory, a processor, and a display;

- wherein the memory is configured to store executable program(s); the processor is configured to execute the program(s) which is(are) stored in the memory, so as to enable the processor to perform following steps:
- acquiring for a same target object medical information from multiple source devices; and
- simultaneously displaying, on a display interface of the display, the medical information from the multiple source devices.

According to another aspect of this disclosure, a medical device is provided, including a memory, a processor, a communication module, and a display;

- wherein the memory is configured to store executable program(s); the processor is configured to execute the program(s) which is(are) stored in the memory, so as to enable the processor to perform following steps:
- acquiring medical information of a target object, and displaying, on a display interface of the display, the medical information; wherein the medical information includes medical information from source device(s) which is(are) in communication connection with the medical device;
- detecting, through the communication module, whether the source device(s) which is(are) in communication connection with the medical device, is(are) changed; and
- adaptively adjusting display content and/or display layout of the display interface, so as to enable the display interface to display the medical information of the source device(s) changed, which is(are) in communication connection with the medical device, when said change is detected.

According to another aspect of this disclosure, a medical device is provided, including a memory, a processor, and a display;

- wherein the memory is configured to store executable program(s); the processor is configured to execute the program(s) which is(are) stored in the memory, so as to enable the processor to perform following steps:

acquiring measurement parameters from at least one measurement device and treatment parameters from at least one treatment device, for a same target object;

configuring a display interface of the display as a multi-device fusion display interface, so as to simultaneously display at least some of the measurement parameters and at least some of the treatment parameters;

wherein the measurement parameters include at least one of: non-invasive blood pressure, invasive blood pressure, oxygen saturation, respiratory parameter, ECG, pulse rate, respiratory rate, cardiac output, carbon dioxide, central venous oxygen saturation, body temperature, end expiratory carbon dioxide;

the treatment parameters include at least one of: positive end expiratory pressure, respiratory rate, tidal volume, gas flow rate, inhalation oxygen concentration, airway pressure, Ramp, inhalation time, name of infusion drug, infusion rate, infused volume, volume to be infused and remaining infusion time.

The medical device and information display method therefor according to embodiments of this disclosure, are capable of displaying the medical information of multiple target objects on the display interface, as well as displaying the medical information of each target object from multiple medical devices. For each target object, the medical information of each medical device related to the each target object is displayed in different display areas, allowing medical staff to not only overview the medical information of multiple target objects so as to monitor multiple target objects, but also easily understand the medical information from various medical devices for each target object, so as to make it easy for medical staff to quickly obtain the necessary information from numerous data.

BRIEF DESCRIPTION OF DRAWINGS

The above and other purposes, features, and advantages of this disclosure becomes more apparent, by providing a more detailed description of the embodiments of this disclosure combining the accompanying drawings. The accompanying drawings provides a further understanding of the embodiments of this disclosure and form a part of the description. The accompanying drawings are used together with the embodiments of this disclosure to explain this disclosure and do not constitute a limitation on this disclosure. In the accompanying drawings, the same reference numerals usually represent the same components or steps.

DETAILED DESCRIPTION

In order to make the purpose, technical solution, and advantages of this disclosure more obvious, the following refers to the attached drawings to describe in detail the exemplary embodiments according to this disclosure. Obviously, the described embodiments are only a part of the embodiments of this disclosure, not all of them. It should be understood that this disclosure is not limited by the example embodiments described here. Based on the embodiments described in this disclosure, all other embodiments obtained by those skilled in the art without creative labor shall fall within the protection scope of this disclosure.

Figure 1:
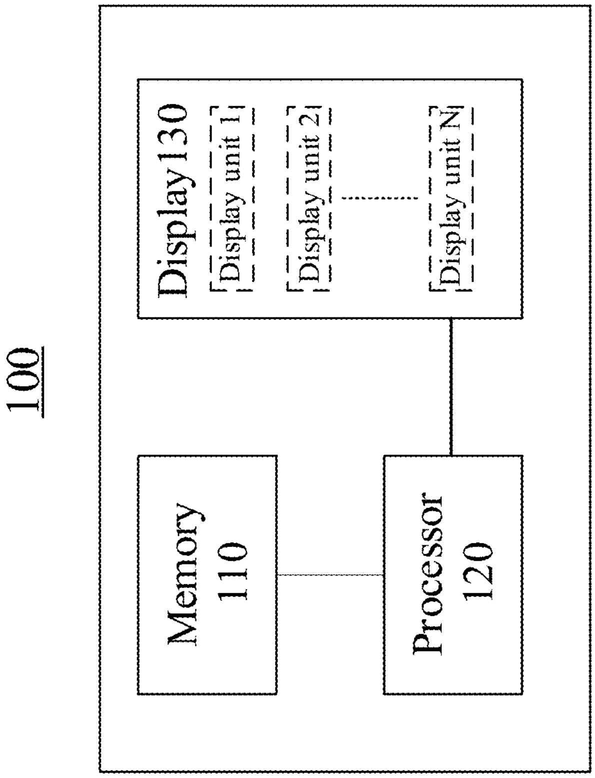
FIG. 1 shows a block diagram of a medical device according to one embodiment of this disclosure.

Firstly, refer to FIG. 1 to describe a medical device according to an embodiment of this disclosure. FIG. 1 shows a block diagram of a medical device according to one embodiment of this disclosure. As shown in FIG. 1, the medical device 100 includes a memory 110, a processor 120, and a display 130. The memory 110 is configured to store executable programs. A display interface of the display 130 includes multiple interactive display units (as shown in FIG. 1, display unit 1, display unit 2 . . . display unit N, where N is a natural number greater than 1). The processor 120 is configured to execute the programs stored in the memory 110, so as to enable the processor 120 to perform following steps: acquiring medical information of multiple target objects, wherein medical information of each target object is derived from multiple source devices; associating medical information of different target objects with different display units; and receiving interactive operation of a user on a display unit, and displaying, on the display interface, detailed information interface of a target object which corresponds to said display unit, wherein the detailed information interface is configured to display a multi-device fusion display interface. Wherein the multi-device fusion display interface is configured to display medical information from the multiple source devices and comprises multiple display areas, wherein each display area displays medical information from at least one source device, and different display areas correspond to different source devices.

In an embodiment of this disclosure, the display 130 of the medical device 100 includes multiple interactive display units, each of which can be configured to display medical information of one target object. When the user clicks (or other interactive operations) on a certain display unit, a detailed information interface of the target object corresponding to the display unit is displayed. Due to the fact that the medical information of one target object is derived from multiple source devices (such as a monitor, a ventilator, an anesthesia machine, an infusion pump, an ECOM, a hemodialysis machine, or an ultrasound device, etc.), this detailed information interface can be configured to display a fusion display interface of multiple devices (that is, multi-device fusion display interface). The multi-device fusion display interface includes multiple display areas, each display area displays medical information from at least one source device, and different display areas correspond to different source devices. Therefore, according to the embodiment of this disclosure, the medical device 100 not only displays the medical information of multiple target objects on the display interface, but also displays the medical information of each target object from multiple medical devices. For each target object, the related medical information of each medical device is displayed in different display areas, allowing medical staff to not only overview the medical information of multiple target objects so as to monitor multiple target objects, but also easily understand the medical information from various medical devices for each target object, so as to make it easy for medical staff to quickly obtain the necessary information from numerous data.

In the embodiment of this disclosure, the aforementioned detailed information interface can also be configured to display a display interface for a single device (that is, single-device display interface), and the processor 120 can also be configured to perform following steps: switching the detailed information interface to display a single-device display interface, when interactive operation of a user for displaying the single-device display interface, is received; wherein the single-device display interface displays medical information of a single source device which is associated with the target object. In this embodiment, the detailed information interface can also display the single-device display interface, which means that for one target object, medical information from multiple source devices, as well as medical information from one of the multiple source devices, can be displayed. This facilitates medical staff to view the medical information from a certain source device for a certain target object according to their requirements, satisfies requirements of medical staff to view data directionally without being disturbed by medical information from other source devices.

In the embodiment of this disclosure, the multi-device fusion display interface includes a plurality of medical information areas (which can be a plurality of display areas described above, or areas included in the display area to display specific medical information). When receiving the interactive operation of the user on a certain medical information area, the processor 120 controls the detailed information interface to switch from the multi-device fusion display interface to the single-device display interface, which displays the medical information from the source device corresponding to the selected medical information area. In this embodiment, the detailed information interface can be switched from the multi-device fusion display interface to the single-device display interface, allowing medical staff to view targeted medical information of a single source device after overview of all source devices of a target object, such as discovering certain anomalies related to a medical device of a certain source device.

In the embodiment of this disclosure, the medical information of a single source device, which is displayed on the single-device display interface, can be more detailed than the medical information of the single source device, which is displayed on the multi-device fusion display interface. In this way, whether the detailed information interface directly displays a single-device display interface, or switches from the multi-device fusion display interface to the single-device display interface, the medical staff can view targeted medical information from a certain single source device, as well as view more detailed medical information from the single source device for providing more reference.

In the embodiment of this disclosure, at least two single-device display interface switching icons, are configured on the multi-device fusion display interface. When receiving interactive operation of the user on the single-device display interface switching icon, the processor 120 controls the detailed information interface to switch from the multi-device fusion display interface to the single-device display interface of the source device which corresponds to the single-device display interface switching icon. In this embodiment, an exemplary switching method from the multi-device fusion display interface to the single-device display interface is provided. That is, the switching process is achieved through the single-device display interface switching icon on the multi-device fusion display interface. Among them, each single-device display interface switching icon corresponds to one single-device display interface, while one single-device display interface corresponds to one source device. The medical information from one source device is displayed in one display area of the multi-device fusion display interface. Therefore, each display area on the multi-device fusion display interface can include one single-device display interface switching icon. Alternatively, multiple single-device display interface switching icons can be arranged in a specific area, such as in a lower area of the detailed information interface.

In an embodiment of this disclosure, in addition to switching from the multi-device fusion display interface to the single-device display interface, it is also possible to switch from the single-device display interface to the multi-device fusion display interface. Based on this, in the embodiment of this disclosure, the single-device display interface can include a multi-device fusion display interface switching icon, and the processor 120 is further configured to perform following steps: switching from the single-device display interface to the multi-device fusion display interface, when interactive operation of the user on the multi-device fusion display interface switching icon, is received. In this embodiment, an exemplary switching method from the single-device display interface to the multi-device fusion display interface is provided. That is, the switching process is achieved through the multi-device fusion display interface switching icon on the single-device display interface.

In the embodiment of this disclosure, in addition to switching from the multi-device fusion display interface to the single-device display interface, and from the single-device display interface to the multi-device fusion display interface, it is also possible to switch from one single-device display interface to another single-device display interface. Based on this, in the embodiment of this disclosure, the single-device display interface includes at least two single-device display interface switching icons. The processor 120 is further configured to perform following steps: when interactive operation of the user on a single-device display interface switching icon, is received, switching the single-device display interface, which is displayed by the display interface, to a single-device display interface of a source device which corresponds to the single-device display interface switching icon. In this embodiment, an exemplary switching method from one single-device display interface to another single-device display interface is provided. That is, there are switching icons for switching to other (one or more) single-device display interfaces, on the single-device display interface. Based on this, it is possible to switch from one single-device display interface to another single-device display interface. Of course, in other embodiments, it is also possible to switch from one single-device display interface to another single-device display interface through other means. For example, one single-device display interface can be switched to the multi-device fusion display interface, and then from the multi-device fusion display interface to another single-device display interface.

In the embodiment of this disclosure, a display layout of each display area of the multi-device fusion display interface is similar to a display layout of the source device which corresponds to the display area. For example, one source device of a certain target object is a ventilator. On the multi-device fusion display interface, there is a display area that displays the medical information of the ventilator, and the display layout of the medical information of the ventilator in this display area, is the same or similar to the display layout of the medical information when it is displayed on the ventilator itself. Here, "similar" refers to the possibility that the medical information of the ventilator, which is displayed in one display area of the multi-device fusion display interface, is less than the medical information which is displayed on the ventilator itself, so that the display layout of this display area is not exactly the same as the display layout on the ventilator itself. This allows medical staff to quickly view the information they need, as they are very familiar with the display layout of the source device, such as the ventilator. Therefore, when the information content is displayed on the multi-device fusion display interface, with adopting the same or similar layout, it enables medical staff to quickly locate the information they need to view without having to search for the required information one by one.

In addition, the display layout between the display areas of the multi-device fusion display interface is similar to a spatial layout between each source device, which corresponds to the display area, relative to the target object. Due to the familiarity of medical staff with the orientation of the source device (such as bedside devices) relative to the target object, when the display layout between various display areas and the spatial layout between each source device relative to the target object are similar, medical staff can easily locate the corresponding display area of the source device on the display interface, making it more efficient for medical staff to view information.

In the embodiment of this disclosure, at least one of following items on the multi-device fusion display interface is customizable by the user: a number of the display areas, the display content and the display layout of each display area, and the display layout between the display areas. The number of display areas depends on the number of the source devices for a certain target object. The display content of each display area can be part or all of the medical information from the corresponding source device (depending on the size of the display area). The display layout of each display area can be the same or similar to the display layout of its corresponding source device (as mentioned earlier), or can be customized by users according to their habits, requirements, etc. The display layout between various display areas (such as medical information from the monitor displayed above, medical information from the ventilator displayed below, etc.) can also be customized according to user requirements. Similarly, the display content and display layout of a single-device display interface are also customizable by users.

In this embodiment, different interface display and layout configurations and different default values are provided when the number/type of source devices are different. If there is only one monitor, a large number of monitoring parameters and waveforms are displayed by default. When there are a monitor and a ventilator, the multi-device fusion display interface can only display some monitoring parameters/waveforms, as well as some ventilator parameters/waveforms. Users can manually change the interface display and layout of the above two situations to different default configurations. When a new patient is online, the system displays different configurations based on whether the online patient only has a monitor or has both monitor and ventilator.

In addition, the user can also customize required interface, such as not requiring the single-device display interface, or defining a multi-device fusion display interface that does not display information for a particular device. Alternatively, some display areas display information for one device, while others display information for multiple devices. For example, when there is a monitor, ventilator, and infusion pump, the interface is divided into two parts, wherein one part displays monitoring information, and the other part displays information for the ventilator and infusion pump.

In this embodiment, the multi-device fusion display interface includes multiple display areas, and the number of display areas is smaller than the number of source devices currently used by the target object.

The following describes examples of a single-device display interface and a multi-device fusion display interface displayed by a medical device according to the embodiment of this disclosure, in conjunction with FIGS. 2 to 6.

Figure 2:
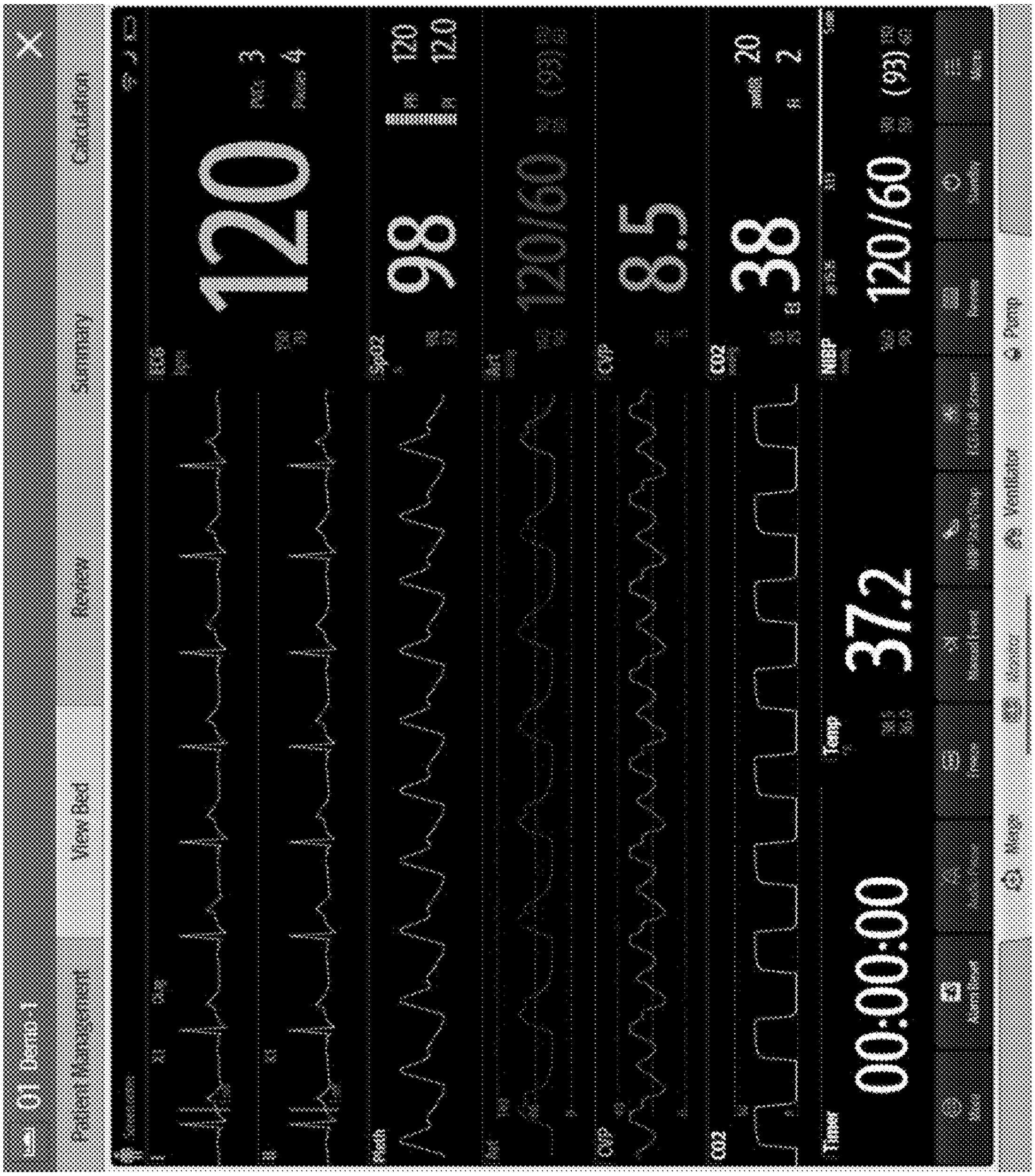
FIG. 2 shows an example of a single-device display interface displayed by a medical device according to an embodiment of this disclosure.

FIG. 2 shows an example of a single-device display interface displayed by a medical device according to an embodiment of this disclosure. As shown in FIG. 2, as an example, the single-device display interface presents physiological information of the monitor for a target object, including various waveform data, parameter value data, etc.

Figure 3:
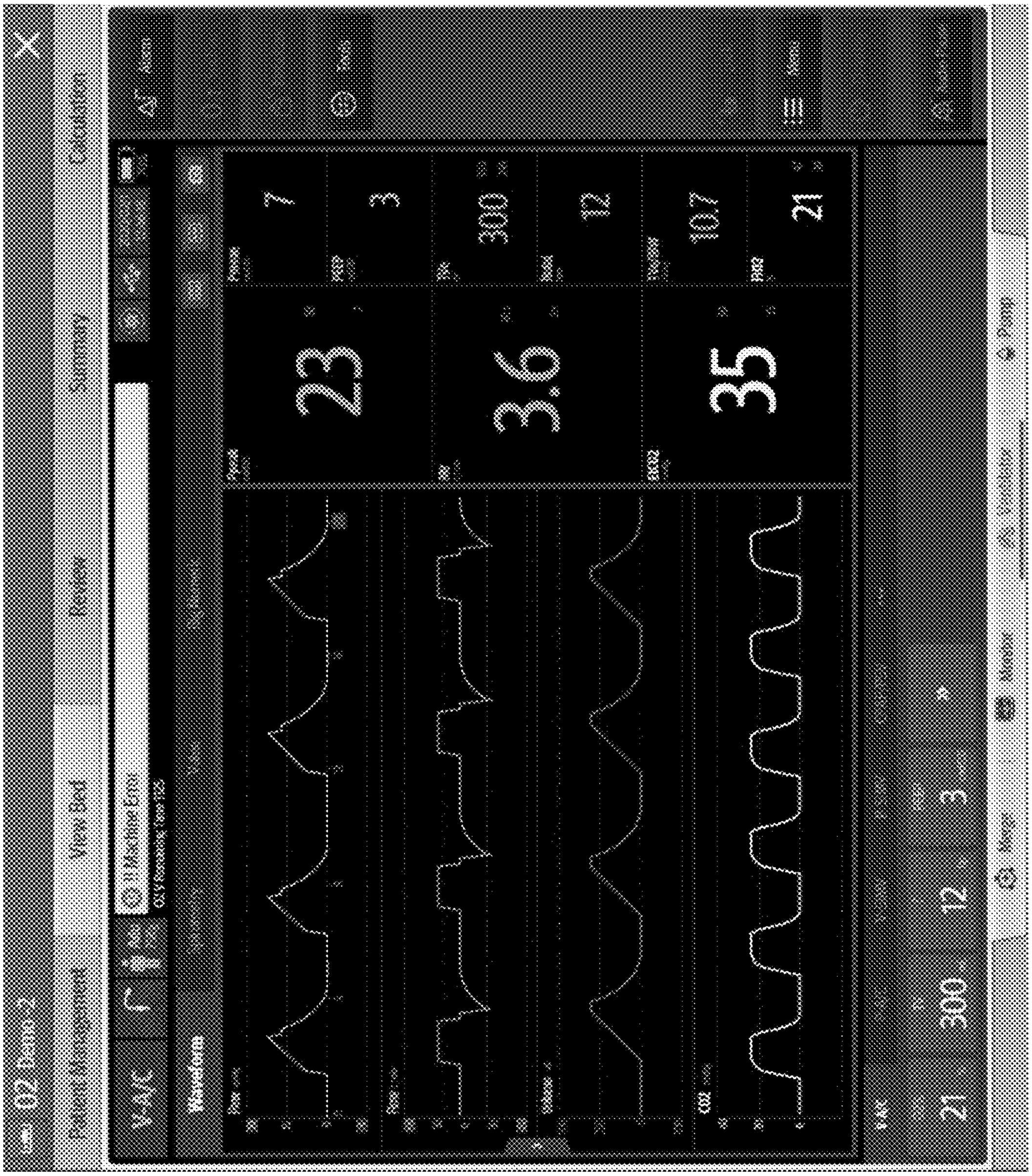
FIG. 3 shows an example of another single-device display interface displayed by a medical device according to an embodiment of this disclosure.

FIG. 3 shows another example of a single-device display interface displayed by a medical device according to an embodiment of this disclosure. As shown in FIG. 3, as an example, the single-device display interface presents physiological information of the ventilator for a target object, including various waveform data, parameter value data, etc.

Figure 4:
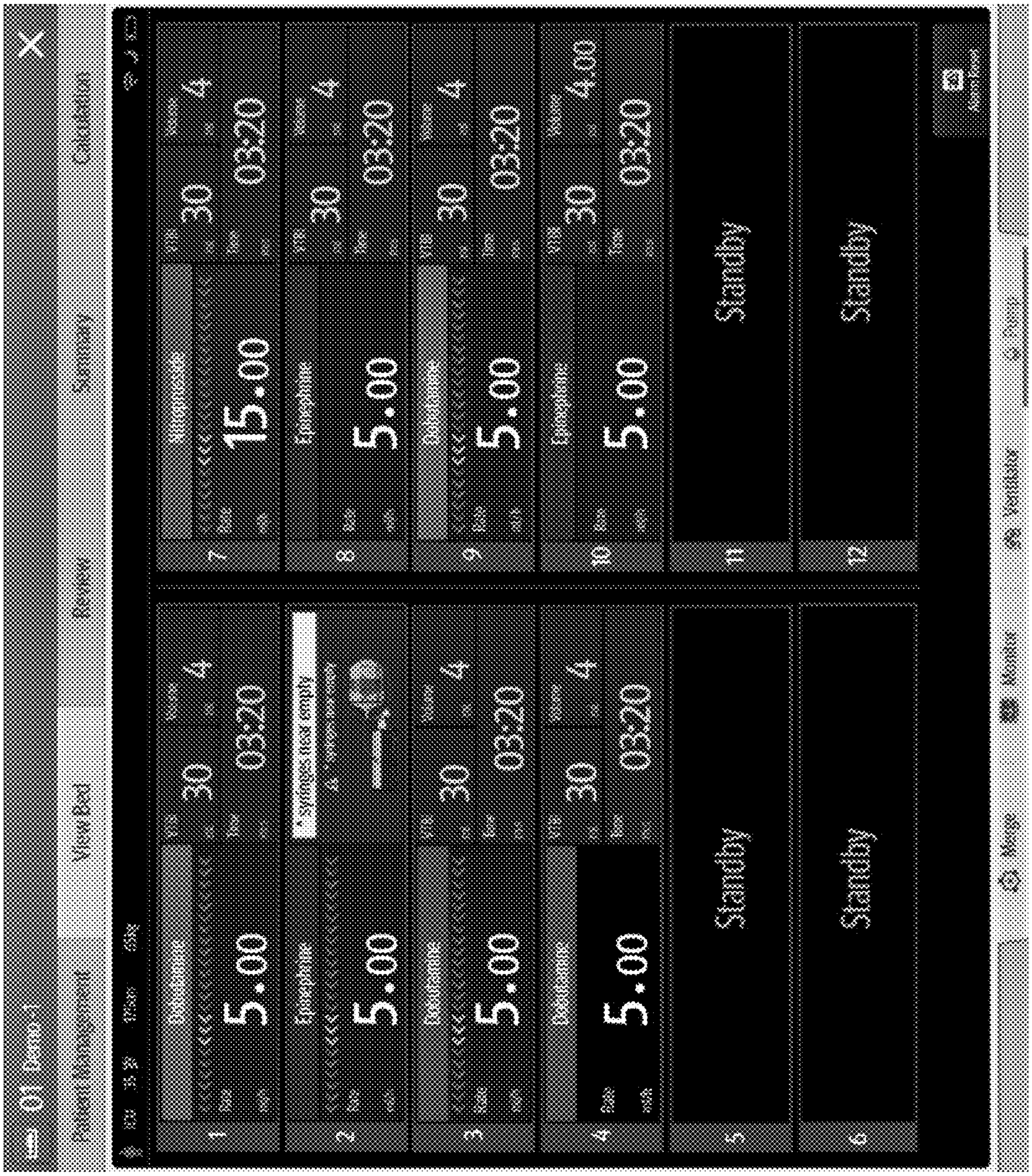
FIG. 4 shows an example of another further single-device display interface displayed by a medical device according to an embodiment of this disclosure.

FIG. 4 shows a schematic diagram of another example of a single-device display interface displayed by a medical device according to an embodiment of this disclosure. As shown in FIG. 4, as an example, the single-device display interface presents information of the infusion pump for a target object, including various infusion information.

Figure 5:
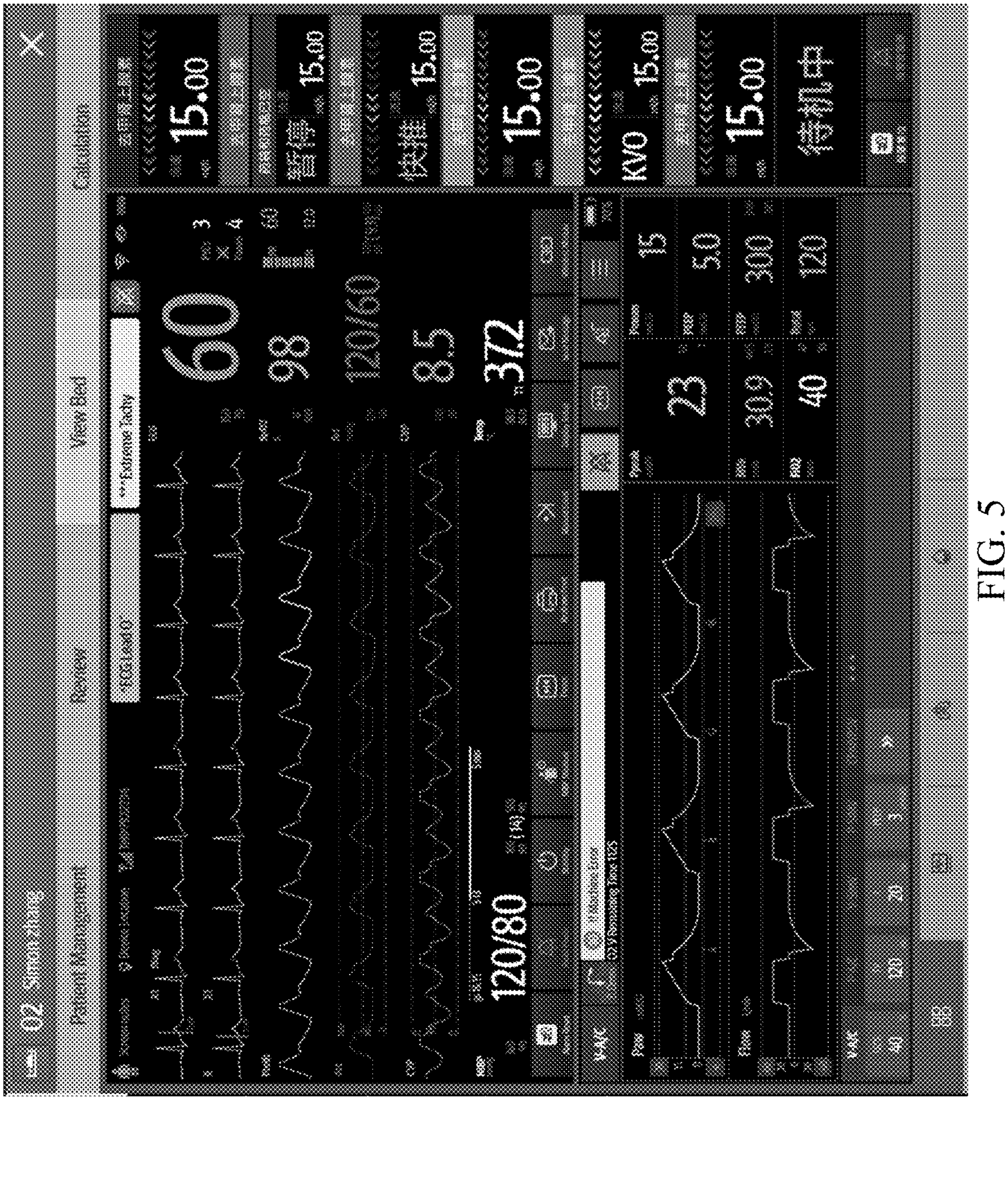
FIG. 5 shows an example of a multi-device fusion display interface displayed by a medical device according to an embodiment of this disclosure.

FIG. 5 shows an example of a multi-device fusion display interface displayed by a medical device according to an embodiment of this disclosure. As shown in FIG. 5, as an example, the multi-device fusion display interface simultaneously displays information of the same object on the monitor, ventilator, and infusion pump. In addition, as shown in FIG. 5, a lower part of the multi-device fusion display interface includes four small icons. The first small icon on the left represents the current multi-device fusion display interface. The second, third, and fourth small icons are the icons for the monitor, ventilator, and infusion pump (i.e., single-device display interface switching icons). When they are clicked, the multi-device fusion display interface is switched to the single-device display interface that displays information of the monitor, the single-device display interface that displays information of the ventilator, and the single-device display interface that displays information of the infusion pump.

Figure 6:
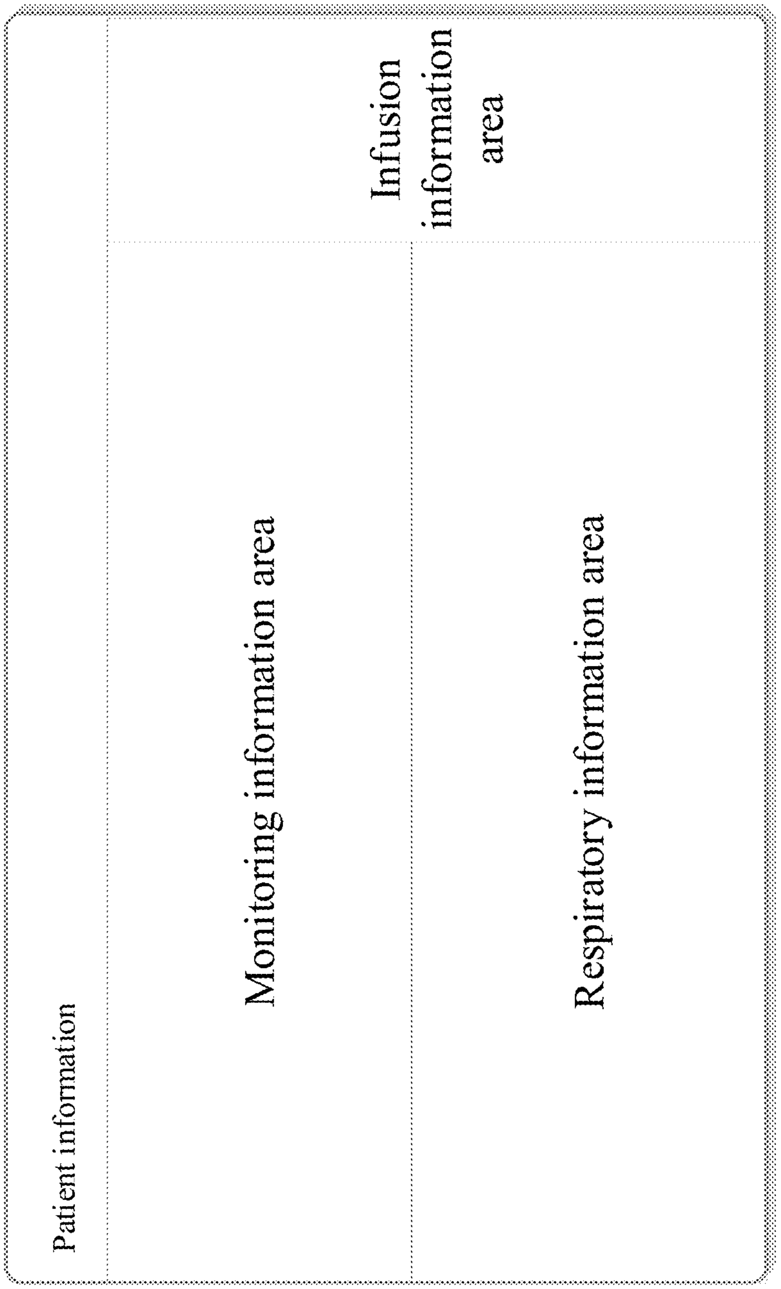
FIG. 6 shows an example of another multi-device fusion display interface displayed by a medical device according to an embodiment of this disclosure.

In the examples in FIGS. 2 to 5, the multi-device fusion display interface includes multiple display areas, with the number of display areas equal to the number of source devices currently being used by the target object. That is, as shown in FIG. 6, the multi-device fusion display interface includes three display areas, namely a monitoring information area, a respiratory information area, and an infusion information area, corresponding to the source devices currently used by the target object—the monitor, ventilator, and infusion pump.

In addition, in the examples shown in FIGS. 2 to 5, the display layout of each display area on the multi-device fusion display interface is similar to the display layout of the source device corresponding to the display area, which enables medical staff to quickly obtain the necessary information. Of course, this is only an example, and the display layout of each display area on the multi-device fusion display interface can also be different from the display layout of the source device corresponding to the display area.

In addition, in the examples shown in FIGS. 2 to 5, key information of the corresponding device is displayed in each display area of the multi-device fusion display interface. For example, the monitoring information area displays data of the monitor, including parameters, waveforms, alarms, etc. The respiratory information area displays parameters, waveforms, alarms, ventilation mode, etc. of the ventilator. The infusion information area displays parameters and alarm information of each pump. In contrast, the single-device display interface can display more detailed information for the corresponding device, such as more parameters and waveforms, as well as various analysis, statistics, and presentation tools that users need.

In the embodiment of this disclosure, the processor 120 can also be configured to perform following steps: configuring display content of the single-device display interface and/or the multi-device fusion display interface, so that the configured single-device display interface and/or the configured multi-device fusion display interface are adapted to a display screen of a mobile terminal independent of the medical device 100 for displaying on the display screen of the mobile terminal. For example, when the display screen is small, such as when displayed on a mobile phone/pad, the display content of the multi-device fusion display interface can be reduced. For example, the multi-device fusion display interface only displays partial parameter information and alarm information, and more information is displayed on the single-device display interface. It is also possible to abandon the multi-device fusion display interface and only remain the single-device display interface.

Figure 7:
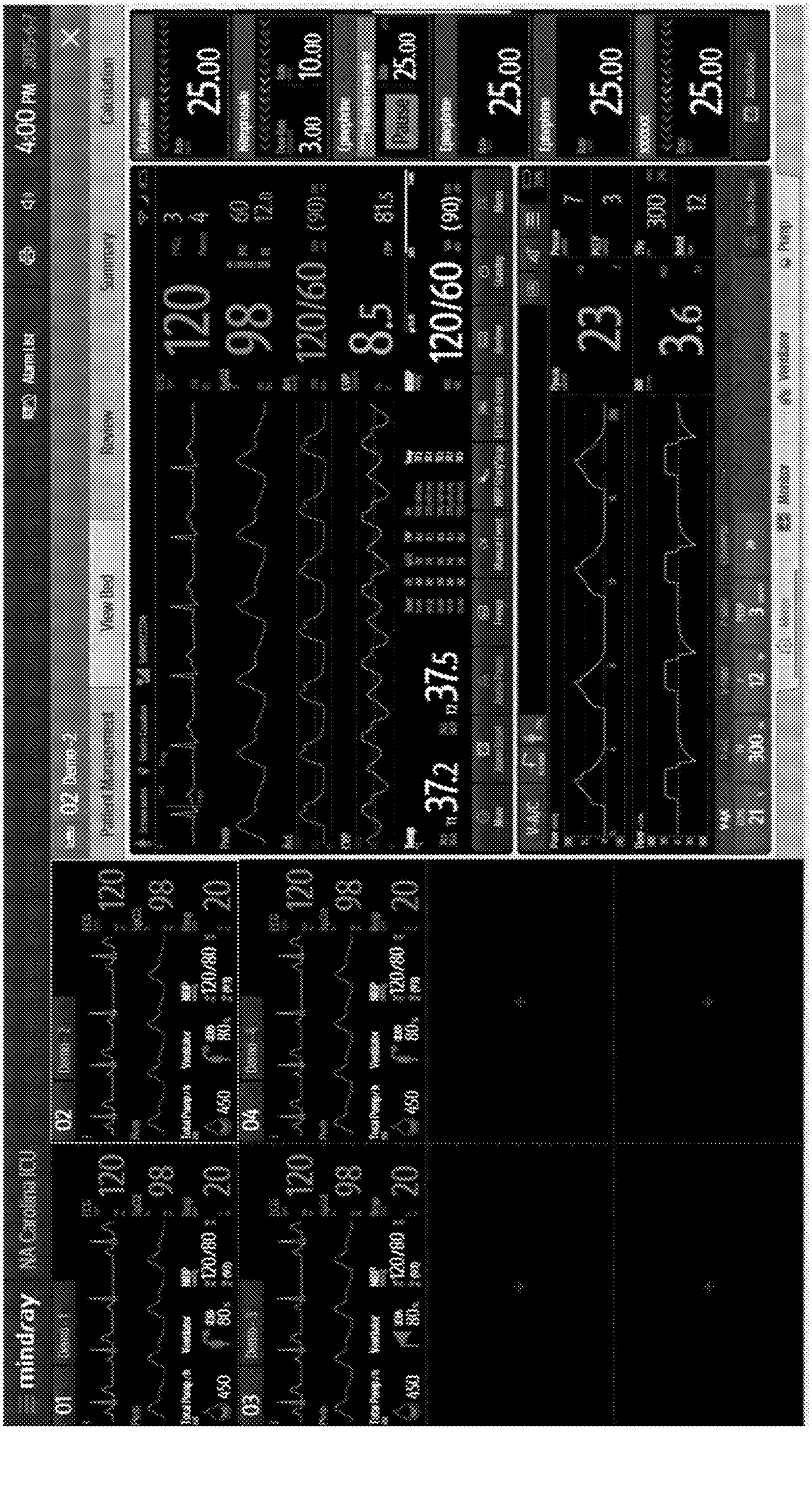
FIG. 7 shows a schematic diagram of a display unit and detailed information page of a medical device according to an embodiment of this disclosure.

FIG. 7 shows a schematic diagram in which a display unit of medical device and a single-device display interface are displayed on the same interface according to the embodiment of this disclosure. In FIG. 7, the left area displays multiple display units (such as the rectangular selection boxes labeled 01, 02, 03, 04 in the left area), and the right area displays the detailed information interface corresponding to the selected display unit.

Please refer to FIG. 7. In the embodiment of this disclosure, the medical information displayed on each display unit can at least include monitoring information and respiratory information, wherein the respiratory information includes a respiratory support mode and an inhalation oxygen concentration. In this embodiment, an example for the type of source device being used by each target object is provided, that is, each target object is at least using a monitor and a ventilator, so at least monitoring information and respiratory information are displayed on each display unit. In addition, the respiratory information includes a respiratory support mode (tracheal intubation, mask, nasal catheter) and an inhalation oxygen concentration (specific value). Compared to only displaying some waveform data, this respiratory information can more intuitively reflect respiratory function recovery of the patient, making it easier for medical staff to distinguish the severity of each patient, which patient requirements more attention, and so on. Due to the display of respiratory support mode and inhalation oxygen concentration on the display unit, even for non-displayed detailed information pages, it is possible to visually observe the recovery of the respiratory energy supply of the patient.

Figure 8:
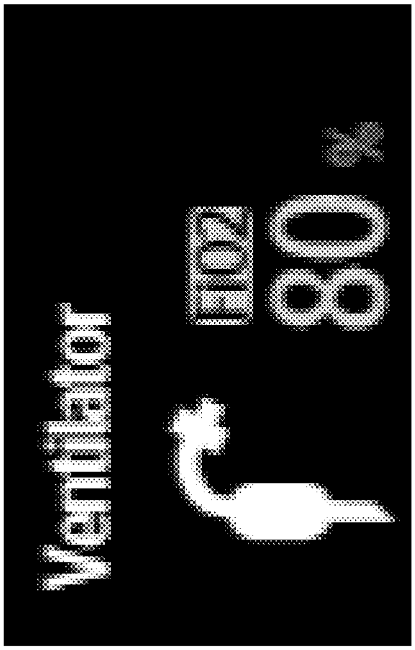
FIG. 8 shows an example of a medical device displaying respiratory information according to an embodiment of this disclosure.

In the embodiment of this disclosure, the display of respiratory support mode includes but is not limited to graphical instruction and textual description. In addition, the respiratory support mode and inhalation oxygen concentration can be displayed together or by dividing into two parameters. FIG. 8 shows an example of a medical device displaying respiratory information according to an embodiment of this disclosure. As shown in FIG. 8, in this example, the respiratory support mode and inhalation oxygen concentration of the patient are displayed.

The above example illustrates a medical device and its display interface according to an embodiment of this disclosure. Based on the above description, the medical device 100 according to the embodiment of this disclosure can not only display medical information of multiple target objects on the display interface, but also display medical information of each target object from multiple medical devices. For each target object, the medical information of each medical device related to the target object is displayed in different display areas, which enable medical staff to not only overview the medical information of multiple target objects and achieve monitoring of multiple target objects, but also have a clear understanding of the medical information of each target object from various medical devices at a glance, making it easy for medical staff to quickly obtain the necessary information from numerous data.

The above provides an exemplary description of a medical device according to one embodiment of this disclosure. The following describes an information display method 900 for a medical device provided according to another aspect of this disclosure, which can be implemented by the medical device 100 mentioned earlier, in conjunction with FIG. 9. For simplicity, only the main steps of method 900 are described here, and its specific details are not described. For more details, please refer to the previous description.

Figure 9:
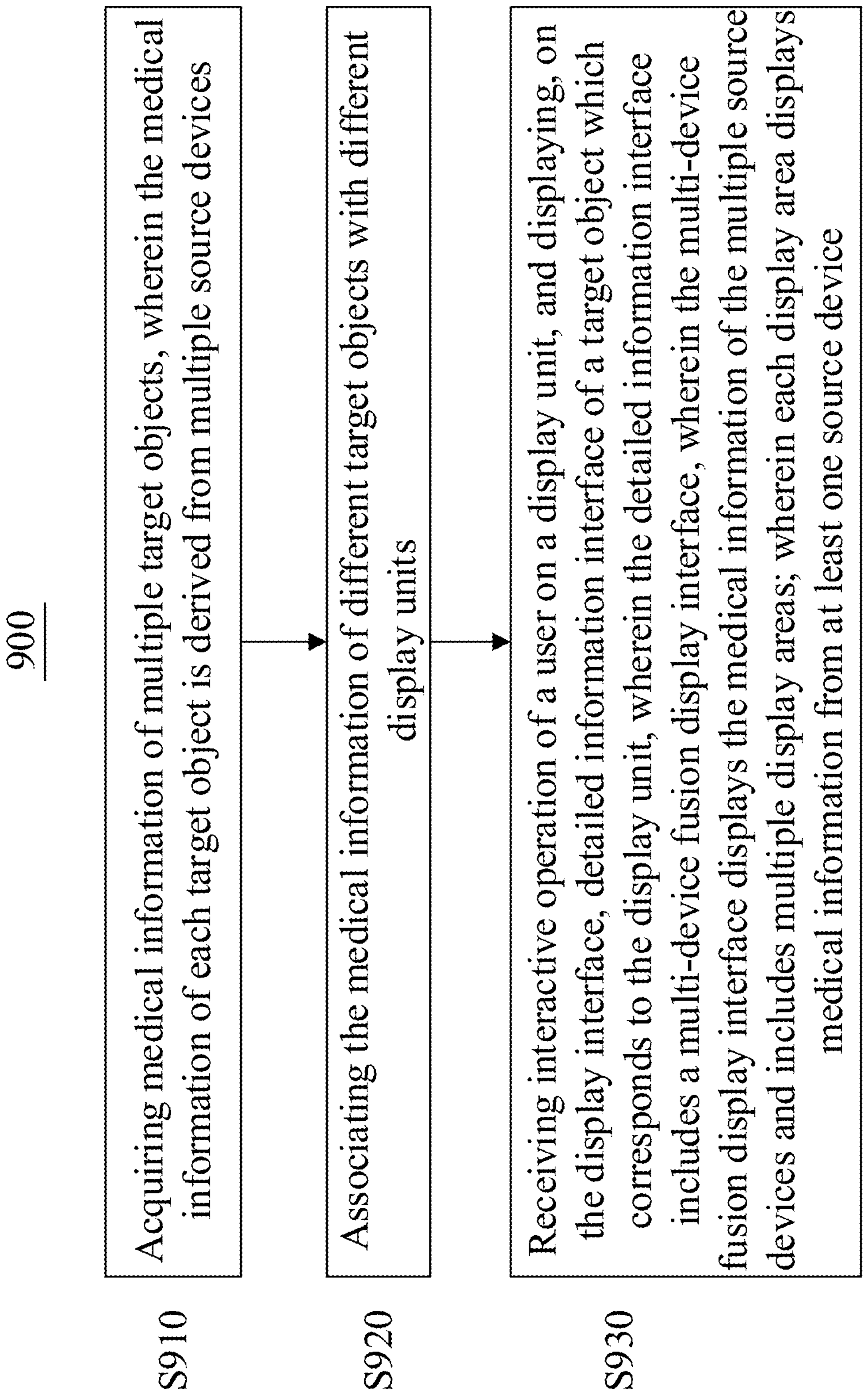
FIG. 9 shows a flowchart of an information display method for a medical device in one embodiment of this disclosure.

As shown in FIG. 9, an information display method 900 for a medical device can include the following steps.

In step S910, medical information of multiple target objects, is acquired, wherein the medical information of each target object is derived from multiple source devices.

In step S920, the medical information of different target objects are associated with different display units.

In step S930, interactive operation of a user on a display unit is received, and detailed information interface of a target object, which corresponds to the display unit, is displayed on the display interface. The detailed information interface includes a multi-device fusion display interface, wherein, the multi-device fusion display interface can display the medical information from the multiple source devices and includes multiple display areas; wherein each display area at least displays medical information from one source device.

In an embodiment of this disclosure, the detailed information interface is further configured to display a single-device display interface. The method 900 further includes: controlling to switch the detailed information interface to display the single-device display interface, when interactive operation of the user for displaying the single-device display interface, is received; wherein the single-device display interface displays medical information of a single source device which is associated with the target object.

In the embodiment of this disclosure, the multi-device fusion display interface includes a plurality of medical information areas, and the method 900 further includes: controlling the detailed information interface to switch from the multi-device fusion display interface to the single-device display interface, when interactive operation of the user on a certain medical information area is received. The single-device display interface displays the medical information from the source device which corresponds to the selected medical information area.

In the embodiment of this disclosure, at least two single-device display interface switching icons are configured on the multi-device fusion display interface, and the method 900 further includes: controlling the detailed information interface to switch from the multi-device fusion display interface to the single-device display interface of the source device which corresponds to the single-device display interface switching icon, when receiving interactive operation of the user on the single-device display interface switching icon.

In the embodiment of this disclosure, the single-device display interface includes a multi-device fusion display interface switching icon, and the method 900 further includes: controlling to switch from the single-device display interface to the multi-device fusion display interface, when receiving interactive operation of the user on the multi-device fusion display interface switching icon.

In the embodiment of this disclosure, the single-device display interface includes at least two single-device display interface switching icons, and the method 900 further includes: controlling to switch from the single-device display interface, which is displayed on the display interface, to a single-device display interface of a source device, which corresponds to a single-device display interface switching icon, when receiving interactive operation of the user on the single-device display interface switching icon.

In the embodiment of this disclosure, medical information of a single source device, displayed on the single-device display interface is more detailed than the medical information of the single source device displayed on the multi-device fusion display interface.

In the embodiment of this disclosure, a display layout between the display areas of the multi-device fusion display interface is similar to a spatial layout between each source device, which corresponds to the display area, relative to the target object.

In the embodiment of this disclosure, at least one of following items on the multi-device fusion display interface is customizable by the user: a number of display areas, display content and layout of each display area, and display layout between the display areas.

In the embodiment of this disclosure, display content and display layout of the single-device display interface can be customized by a user.

In the embodiment of this disclosure, the method 900 further includes: displaying, on each display unit, the medical information of the target object which corresponds to the display unit, wherein the medical information displayed on each display unit at least includes monitoring information and respiratory information, wherein the respiratory information includes a respiratory support mode and an inhalation oxygen concentration.

In the embodiment of this disclosure, the respiratory support mode is displayed in graphical information or textual description information.

In the embodiment of this disclosure, the medical device includes a central station, and the source device includes at least one of: a monitor, a ventilator, an anesthesia machine, an infusion pump, an ECOM, a hemodialysis machine, or an ultrasound device.

In the embodiment of this disclosure, the method 900 further includes: configuring display content of the single-device display interface and/or display content of the multi-device fusion display interface, so that the configured single-device display interface and/or the configured multi-device fusion display interface are adapted to a display screen of a mobile terminal independent of the medical device for displaying on the display screen of the mobile terminal.

Based on the above description, the information display method 900 of the medical device according to the embodiment of this disclosure can not only display medical information of multiple target objects on the display interface, but also display medical information of each target object from multiple medical devices. For each target object, the medical information of each medical device related to it is displayed in different display areas, which enable medical staff to not only overview the medical information of multiple target objects and achieve monitoring of multiple target objects, but also have a clear understanding of the medical information of each target object from various medical devices at a glance, making it easy for medical staff to quickly obtain the necessary information from numerous data.

Figure 10:
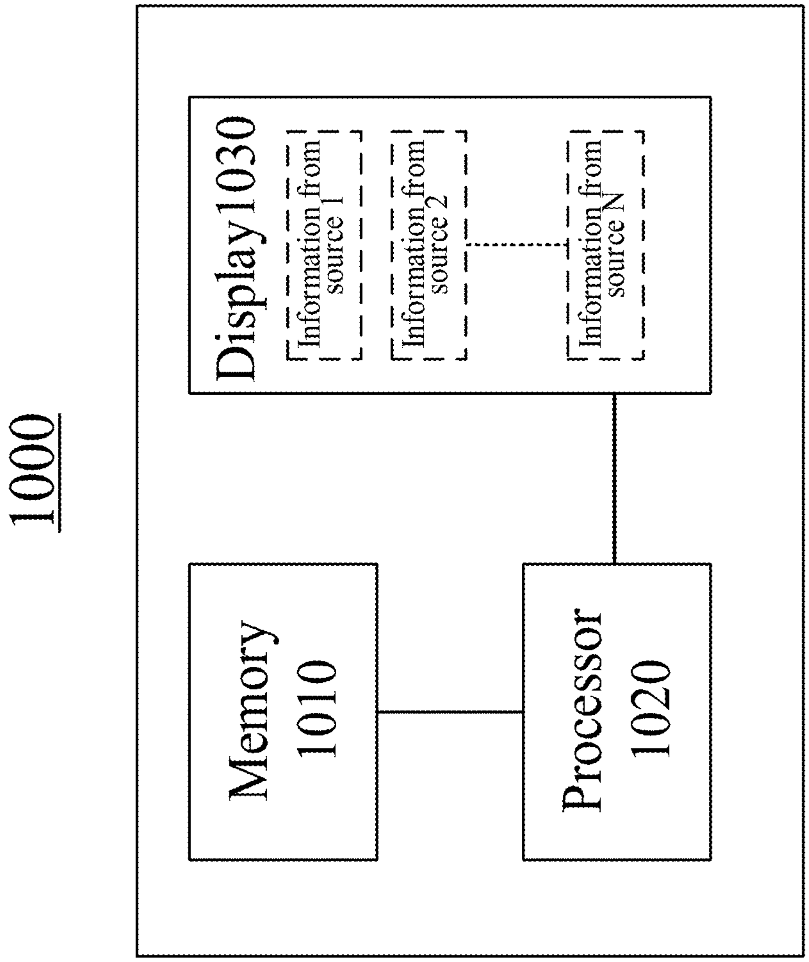
FIG. 10 shows a block diagram of a medical device according to another embodiment of this disclosure.

The following describes a medical device 1000 according to another embodiment of this disclosure, in conjunction with FIG. 10. As shown in FIG. 10, the medical device 1000 includes a memory 1010, a processor 1020, and a display 1030, wherein the memory 1010 is configured to store executable programs. The processor 1020 is configured to execute programs stored in the memory 1010, so as to enable the processor 1020 to perform following steps: acquiring medical information from multiple source devices, for a same target object; simultaneously displaying, on a display interface of the display 1030, the medical information from the multiple source devices (as shown in FIG. 10, information from source 1 (i.e. medical information from source device 1), information from source 2 (i.e. medical information from source device 2), . . . , and information from source N (i.e. medical information from source device N)).

In this embodiment, the medical device 1000 can display the medical information from multiple devices for one target object, which enable medical staff to have a clear understanding of the medical information of the target object from various devices at a glance, thereby facilitating medical staff to quickly obtain the necessary information from numerous data.

In the embodiment of this disclosure, the medical information may include medical data and medical related video data. Correspondingly, the source device may include at least one medical device that provides medical data, and at least one camera that provides video data. Correspondingly, simultaneously displaying the medical information from multiple source devices on the display interface of display 1030, including simultaneously displaying medical data and video data on the display interface of display 1030. In this embodiment, the source device can not only include the medical device, but also include a camera, so that the obtained medical information not only includes medical data, but also includes video data, enabling medical staff to observe the patient condition through video data while referencing medical data, which can better enable the medical staff to monitor the patient.

In the embodiment of this disclosure, the above medical data may include at least one of the followings: ultrasound data provided by the ultrasound device, vital sign data provided by the monitoring device, respiratory data provided by the ventilator, infusion data provided by the infusion pump, anesthesia data provided by the anesthesia machine, and hemodialysis data provided by the hemodialysis machine.

The following description of the medical device 1000 are similar to the multi-device fusion display interface/single-device display interface of the previous embodiment of medical device 100. For simplicity, here just gives a brief overview and no further details are provided.

In the embodiment of this disclosure, the processor 1020 can also control the display 1030 to display medical information from multiple source devices for the same target object on a multi-device fusion display interface. The multi-device fusion display interface includes multiple display areas, each display area displays medical information from at least one source device. The medical information displayed on each display area corresponds to different source device.

In the embodiment of this disclosure, the detailed information interface is further configured to display the single-device display interface, and the processor 1020 is further configured to perform following step: controlling the detailed information interface to switch, so as to display the single-device display interface, when receiving interaction operation of a user for displaying the single-device display interface.

In the embodiment of this disclosure, the multi-device fusion display interface includes a plurality of medical information areas, and the processor 1020 is further configured to perform following step: controlling the detail information display interface to switch from the multi-device fusion display interface to the single-device display interface, when receiving interactive operation of the user on a certain medical information area, wherein the single-device display interface displays the medical information from the source device which corresponds to the selected medical information area.

In the embodiment of this disclosure, at least two single-device display interface switching icons are configured on the multi-device fusion display interface, and the processor 1020 is further configured to perform following steps: controlling the detailed information interface to switch from the multi-device fusion display interface to the single-device display interface of a source device which corresponds to the single-device display interface switching icon, when receiving interactive operation of the user on the single-device display interface switching icon.

In the embodiment of this disclosure, the single-device display interface includes a multi-device fusion display interface switching icon, and the processor 1020 is further configured to perform following step: switching from the single-device display interface to the multi-device fusion display interface, when receiving interactive operation of the user on the multi-device fusion display interface switching icon.

In the embodiment of this disclosure, the single-device display interface includes at least two single-device display interface switching icons, and the processor 1020 is further configured to perform following step: switching from a single-device display interface, which is currently displayed on the display interface to a single-device display interface of a source device which corresponds to a single-device display interface switching icon; when receiving interactive operation of the user on the single-device display interface switching icon.

Based on the above description, according to the embodiment of this disclosure, the medical device 1000 can display medical information from multiple devices for a target object, enabling medical staff to have a clear understanding of the medical information from various devices for the target object, thereby facilitating medical staff to quickly obtain the necessary information from numerous data.

Figure 11:
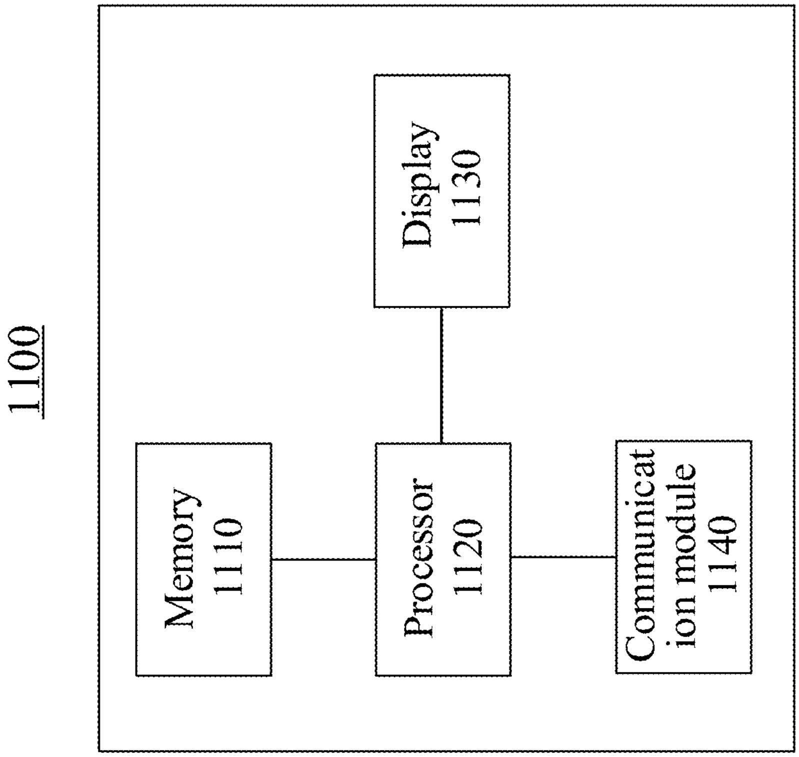
FIG. 11 shows a block diagram of a medical device according to a further embodiment of this disclosure.

The following describes a medical device 1100 according to another embodiment of this disclosure, in conjunction with FIG. 11. As shown in FIG. 11, the medical device 1100 includes a memory 1110, a processor 1120, a communication module 1140, and a display 1130, wherein the memory 1110 is configured to store executable programs, the processor 1120 is configured to execute programs stored in the memory 1110, so as to enable the processor 1120 to perform following steps: acquiring medical information of a target object, and displaying, on a display interface of the display 1130, the medical information, wherein the medical information includes medical information from a source device which is in communication connection with the medical device 1100; detecting, through the communication module 1140, whether the source device, which is in communication connection with the medical device, is changed; and adaptively adjusting display content and/or display layout of the display interface, so as to enable the display interface to display medical information of the changed source device which is in communication connection with the medical device 1100, when detecting the changing.

In this embodiment, the medical device 1100 can adaptively adjust the display content and/or display layout of the display interface based on a change in the source device which is in communication connection with the medical device 1100, so that the display interface can display medical information from the source device which is currently in communication connection with the medical device 1100. For example, when a monitor and ventilator are connected to a central station, the central station can configure its display interface as a multi-device fusion display interface, which is divided into two parts: a monitor information area and a respiratory information area. When the devices, which are in communication connection with the central station communication, change, such as when an infusion pump is connected with the central station which has been connected with a monitor and a ventilator, the multi-device fusion display interface is adaptively adjusted and divided into three parts, including the monitoring information area, the respiratory information area, and an infusion information area, as shown in FIG. 6. In addition, the data of the medical device 1100 itself can also be displayed on the display interface of the display 1130, which means that the obtained medical information can also include data from the medical device 1100 itself.

Therefore, according to this embodiment, the medical device 1100 can adaptively adjust the display content and/or display layout of its display interface based on the detection of changes in the source devices which are connected to it, greatly improving the readability when multiple devices are connected, enabling medical staff to quickly obtain the information needed from various devices. In addition, the basic original interface can also be displayed on the multi-device fusion display interface. For example, when the medical device is a monitor, its multi-device fusion display interface can be displayed according to the layout and content of the screen of the monitor. When other devices (such as ventilator, infusion pump, etc.) are detected to be connected, the displayed parameters and waveforms can be reduced according to the screen size.

The following descriptions of medical device 1100 are similar to the multi-device fusion display interface/single-device display interface of the previous embodiment of the medical device 100. For simplicity, there just gives a brief overview and no further details are provided.

In the embodiment of this disclosure, when a single source device is in communication connection with the medical device 1100, the display interface is a single-device display interface, which displays medical information from the single source device associated with the target object. When multiple source devices are in communication connection with the medical device 1100, the display interface is a multi-device fusion display interface. The multi-device fusion display interface is configured to display medical information from multiple source devices and includes multiple display areas. Each display area displays medical information from at least one source device, and different display areas correspond to different source devices.

In the embodiment of this disclosure, the multi-device fusion display interface includes a plurality of medical information areas. The processor 1120 switches the multi-device fusion display interface to the single-device display interface, when receiving interactive operation of a user on a certain medical information area, wherein the single-device display interface displays the medical information from a source device which corresponds to the selected medical information area.

In the embodiment of this disclosure, at least two single-device display interface switching icons are configured on the multi-device fusion display interface. When receiving interactive operation of a user on a single-device display interface switching icon, the processor 1120 switches the multi-device fusion display interface to the single-device display interface of the source device which corresponds to said single-device display interface switching icon.

In the embodiment of this disclosure, the single-device display interface includes a multi-device fusion display interface switching icon. The processor 1120 switches the single-device display interface to the multi-device fusion display interface, when receiving interactive operation of a user on the multi-device fusion display interface switching icon.

In the embodiment of this disclosure, the single-device display interface includes at least two single-device display interface switching icons. When receiving interactive operation of a user on a single-device display interface switching icon, the processor 1120 switches a single-device display interface which is currently displayed on the display interface, to a single-device display interface of a source device which corresponds to said single-device display interface switching icon.

Based on the above description, the medical device 1100 according to this embodiment can adaptively adjust the display content and/or display layout of its display interface according to the detected changes in the source device connected to it, greatly improving the readability of multi-device connections, enabling medical staff to quickly obtain the information needed on various devices.

Figure 12:
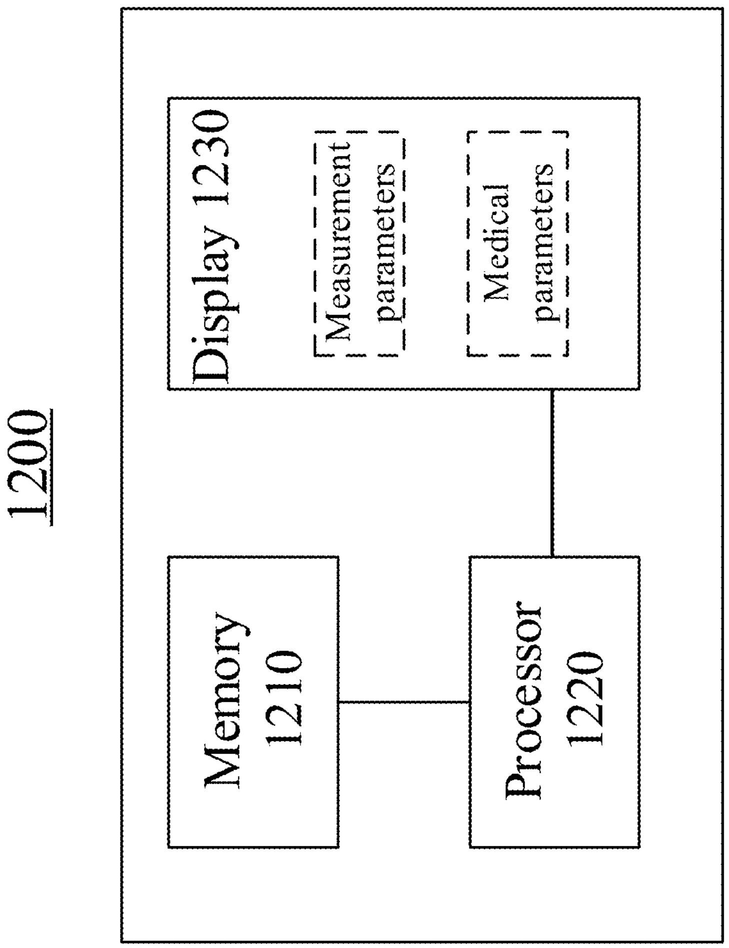
FIG. 12 shows a block diagram of a medical device according to another further embodiment of this disclosure.

The following describes a medical device 1200 according to another embodiment of this disclosure, in conjunction with FIG. 12. As shown in FIG. 12, medical device 1200 includes a memory 1210, a processor 1220, and a display 1230, wherein the memory 1210 is configured to store executable programs. The processor 1220 is configured to execute programs stored in memory, so as to enable the processor 1120 to perform following steps: acquiring measurement parameters from at least one measurement device and treatment parameters from at least one treatment device, for a same target object; configuring a display interface of the display 1230 as a multi-device fusion display interface, so as to simultaneously display at least some of the measurement parameters and at least some of the treatment parameters. The measurement parameters include at least one of: non-invasive blood pressure (NIBP), invasive blood pressure (IBP), oxygen saturation (SpO2), respiratory parameter (RESP), ECG, pulse rate (PR), respiratory rate (RR), cardiac output (C.O.), carbon dioxide (CO2), central venous oxygen saturation (ScvO2), body temperature (TEMP), end expiratory carbon dioxide (EtCO2). The treatment parameters include at least one of: positive end expiratory pressure (PEEP), respiratory rate (RR), tidal volume (VT), gas flow rate (Flow), inhalation oxygen concentration (FiO2), airway pressure (Paw), Ramp, inhalation time (Ti), name of infusion drug, infusion rate, infused volume, volume to be infused and remaining infusion time.

In this embodiment, the medical device 1200 acquires data from measurement devices and medical devices for the same target object, and simultaneously displays data from these two types of devices through a multi-device fusion display interface, which enables medical staff to conveniently acquire physiological and treatment information of the target object, thereby combining these two types of information to provide reasonable treatment or care for the target object.

The following descriptions of medical device 1200 are similar to the multi-device fusion display interface/single-device display interface of the previous embodiment of medical device 100. For simplicity, here just gives a brief overview and no further details are provided.

In the embodiment of this disclosure, both the measurement parameters and the treatment parameters serve as the medical information of the target object, and both the measurement devices and treatment devices serve as the source devices of the medical information. The multi-device fusion display interface is configured to display the medical information from at least two source devices, and includes multiple display areas. Each display area displays medical information from at least one source device, and different display areas correspond to different source devices.

In the embodiment of this disclosure, the multi-device fusion display interface includes a plurality of medical information areas. The processor 1220 switches the multi-device fusion display interface to the single-device display interface, when receiving interactive operation of a user on a certain medical information area, wherein the single-device display interface displays the medical information from the source device which corresponds to the selected medical information area.

In the embodiment of this disclosure, at least two single-device display interface switching icons are configured on the multi-device fusion display interface. When receiving interactive operation of a user on a single-device display interface switching icon, the processor 1220 switches the multi-device fusion display interface to the single-device display interface of the source device which corresponds to said single-device display interface switching icon.

In the embodiment of this disclosure, the single-device display interface includes a multi-device fusion display interface switching icon. The processor 1220 switches the single-device display interface to the multi-device fusion display interface, when receiving interactive operation of a user on the multi-device fusion display interface switching icon.

In the embodiment of this disclosure, the single-device display interface includes at least two single-device display interface switching icons. When receiving interactive operation of a user on a single-device display interface switching icon, the processor 1220 switches a single-device display interface which is currently displayed on the display interface to a single-device display interface of a source device which corresponds to said single-device display interface switching icon.

Based on the above description, according to the embodiment of this disclosure, the medical device 1200 can acquire data from measurement devices and medical devices for the same target object, and simultaneously display data from these two types of devices through a multi-device fusion display interface, which enables the medical staff to conveniently obtain physiological and treatment information of the target object, thereby combining these two types of information to provide reasonable treatment or care for the target object.

Although exemplary embodiments have been described here with reference to the accompanying drawings, it should be understood that the aforementioned exemplary embodiments are only exemplary and are not intended to limit the scope of this disclosure to this extent. Ordinary technical personnel in this field can make various changes and modifications without deviating from the scope and spirit of this disclosure. All these changes and modifications are intended to be included within the scope of this disclosure as claimed in the attached claims.

Ordinary technical personnel in this field can realize that the units and algorithm steps of each example described in combination with the disclosed embodiments in this disclosure can be implemented in electronic hardware, or a combination of computer software and electronic hardware. Whether these functions are executed in hardware or software depends on the specific application and design constraints of the technical solution. Professional technicians may use different methods to achieve the described functions for each specific application, but such implementation should not be considered beyond the scope of this disclosure.

In the several embodiments provided in this disclosure, it should be understood that the disclosed devices and methods can be implemented in other ways. For example, the device embodiments described above are only illustrative. For example, the division of units is only a logical functional division, and there may be other division methods in actual implementation. For example, a plurality of units or components can be combined or integrated into another device, or some features can be ignored or not executed.

The description provided here provides a large number of specific details. However, it can be understood that embodiments of this disclosure can be practiced without these specific details. In some examples, well-known methods, structures, and techniques are not shown in detail to avoid blurring the understanding of this description.

Similarly, it should be understood that in order to streamline this disclosure and assist in understanding one or more of the various aspects of this disclosure, in the description of exemplary embodiments of this disclosure, the various features of this disclosure are sometimes grouped together into a single embodiment, diagram, or description thereof. However, the method of this disclosure should not be interpreted as reflecting the intention that the claimed protection of this disclosure requires more features than those explicitly recorded in each claim. More precisely, as reflected in the corresponding claims, the inventive point is that the corresponding technical problem can be solved with less than all features of a single disclosed embodiment. Therefore, the claims following the specific implementations are explicitly incorporated into the specific implementations, where each claim itself serves as a separate embodiment of this disclosure.

Technicians in this field can understand that, in addition to mutual exclusion between features, any combination can be configured to combine all features disclosed in this description (including accompanying claims, abstracts, and drawings), as well as all processes or units of any method or device so disclosed. Unless otherwise explicitly stated, each feature disclosed in this description (including accompanying claims, abstracts, and accompanying drawings) may be replaced by alternative features that provide the same, equivalent, or similar purpose.

In addition, those skilled in the art can understand that although some embodiments herein include certain features included rather than other features in other embodiments, the combination of features of different embodiments means that they fall into the scope of this disclosure and form different embodiments. For example, in the claims, any one of the claimed embodiments can be used in any combination.

The embodiments of various components of this disclosure can be implemented in hardware, software modules running on one or more processors, or a combination of them. Technicians in this field should understand that a microprocessor or digital signal processor (DSP) can be used in practice to implement some or all of the functions of some modules according to embodiments of this disclosure. This disclosure can also be implemented as a device program (such as a computer program and a computer program product) for executing some or all of the methods described herein. The program implementing this disclosure can be stored on a computer-readable medium or can take the form of one or more signals. Such signals can be downloaded from internet websites, provided on carrier signals, or in any other form.

It should be noted that the above embodiments illustrate this disclosure rather than limit it, and those skilled in the art can design alternative embodiments without departing from the scope of the attached claims. In the claims, any reference symbol between parentheses should not be constructed as a restriction on the claims. The word “including”, “comprising” and their variants, do not exclude the presence of components or steps not listed in the claims. The words “a/an” or “one” before a component do not exclude the existence of multiple such components. This disclosure can be implemented with the help of hardware consisting of several different components and with the help of appropriately programmed computers. Among the unit claims that list several devices, several of these devices can be specifically embodied through the same hardware item. The use of words “first”, “second”, and “third” does not indicate any order. These words can be interpreted as names.

The above is only the specific implementation method or explanation of the specific implementation method of this disclosure. The protection scope of this disclosure is not limited to this. Any technical personnel familiar with the technical field can easily think of changes or replacements within the technical scope disclosed in this disclosure, and these changes or replacements should fall into the protection scope of this disclosure. The protection scope of this disclosure shall be based on the protection scope of the claims.

What is claimed is:

1. A medical device, comprising:

a memory, configured to store an executable program;

a display having a display interface, wherein the display interface comprises multiple interactive display units; and a processor, configured to execute the executable program to perform following steps:

acquiring medical information of multiple patients being monitored, wherein the medical information of each of the multiple patients is from multiple source devices; associating the medical information of each of the multiple patients with a respective one of the multiple interactive display units;

displaying, on the display interface, the multiple interactive display units; receiving interactive operation of a user on one of the displayed multiple interactive display units; and in response to the interactive operation, displaying, on the display interface, a detailed information interface of a patient corresponding to the one of the displayed multiple interactive display units, wherein the detailed information interface is configured to display a multi-device fusion display interface corresponding to the patient, wherein the multi-device fusion display interface is configured to display the medical information of the patient from multiple source devices in multiple display areas, the multiple source devices associated with the patient comprise a patient monitor, a ventilator, and an infusion pump, each of the multiple display areas displays the medical information of the patient from a respective source device, different display areas correspond to different source devices, and the multiple display areas associated with the patient comprise a monitoring information area for displaying a monitoring parameter from the patient monitor, a respiratory information area for display a respiratory parameter from the ventilator, and an infusion information area for displaying an infusion parameter from the infusion pump, wherein the infusion parameter comprises a name of an infusion drug and an infusion rate;

wherein the multiple display areas, corresponding to the multiple source devices, of the multi-device fusion display interface each has a respective display layout that is similar to a display layout of a respective one of the multiple source devices which corresponds to said display area, and the medical information of the source device, which is displayed in said display area of the multi-device fusion display interface, is less than the medical information which is displayed on the source device itself; and wherein a display arrangement, among the multiple display areas of the multi-device fusion display interface, is similar to a spatial layout of the multiple source devices which respectively correspond to the multiple display areas relative to the patient.

2. The medical device according to claim 1, wherein the detailed information interface is further configured to display a single-device display interface, and the processor further performs the following step:

controlling the detailed information interface to switch to display the single-device display interface, when interactive operation of the user for displaying the single-device display interface is received, wherein the single-device display interface displays the medical information from a single source device associated with the patient.

3. The medical device according to claim 2, wherein the multi-device fusion display interface comprises multiple medical information areas, and the processor further performs the following step:

controlling the detailed information interface to switch from the multi-device fusion display interface to the single-device display interface, when interactive operation of the user on a medical information area is received, wherein the single-device display interface displays the medical information from a source device corresponding to a selected medical information area.

4. The medical device according to claim 2, wherein the multi-device fusion display interface is configured with at least two single-device display interface switching icons, and the processor further performs the following step:

controlling the detailed information interface to switch from the multi-device fusion display interface to the single-device display interface of a source device corresponding to a single-device display interface switching icon, when interactive operation of the user on the single-device display interface switching icon is received.

5. The medical device according to claim 2, wherein the single-device display interface comprises a multi-device fusion display interface switching icon, and the processor further performs the following step:

controlling to switch from the single-device display interface to the multi-device fusion display interface, when interactive operation of the user on the multi-device fusion display interface switching icon is received.

6. The medical device according to claim 2, wherein the single-device display interface comprises at least two single-device display interface switching icons, and the processor further performs the following step:

controlling to switch from a currently displayed single-device display interface to the single-device display interface of a source device corresponding to a single-device display interface switching icon, when interactive operation of the user on the single-device display interface switching icon is received.

7. The medical device according to claim 2, wherein:

the medical information from the single source device is displayed more detailed on the single-device display interface than on the multi-device fusion display interface; or display content and display layout of the single-device display interface is capable of being customized by the user; or the processor further performs the following step: configuring display content of the single-device display interface or display content of the multi-device fusion display interface, so as to enable the configured single-device display interface or the configured multi-device fusion display interface to adapt to a display screen of a mobile terminal for displaying, wherein the mobile terminal is independent of the medical device.

8. The medical device according to claim 1, wherein the medical device is a central station, and the multiple source devices further comprise at least one of: an anesthesia machine, an ECOM, a hemodialysis machine, or an ultrasound device.

9. The medical device according to claim 1, wherein the medical information, which is displayed on each interactive display unit, at least comprises: monitoring information and respiratory information, wherein the respiratory information comprises a respiratory support mode and an inhalation oxygen concentration.

10. The medical device according to claim 9, wherein the respiratory support mode is displayed through graphical or textual description information.

11. The medical device according to claim 1, wherein at least one of following items on the multi-device fusion display interface is capable of being customized by the user: a number of the multiple display areas, the display content and display layout of each of the multiple display areas, or the display arrangement among the multiple display areas.

* * * * *